Patented Dec. 26, 1933

1,941,427

UNITED STATES PATENT OFFICE 1,941,427

METHOD OF MAKING SULPHUR TRIOXIDE

Alling P. Beardsley, Plainfield, N. J., and Napoleon Arthur Laury, Rockville Center, N. Y., assignors to The Calco Chemical Company, Inc., Bound Brook, N. J., a corporation of Delaware No Drawing. Application May 13, 1929
Serial No. 362,882

14 Claims. (Cl. 23—175)

This invention relates to a method of making sulphur trioxide and to a catalyst for use in said method.

In making sulphuric acid by the contact method, it is customary to bring sulphur dioxide and oxygen into contact with a catalyst at an elevated temperature. While the most common catalyst for this purpose is platinum, the catalytic action of vanadium in this process has long been recognized, and vanadium has to some extent been used as a catalyst in carrying out the method commercially.

We have discovered that the catalytic action of vanadium in causing a reaction between sulphur dioxide gas and oxygen is greatly increased by the presence of the rare element rubidium, and that rubidium acts as a promoter to the catalytic action of vanadium, and serves both to increase the catalytic action throughout the temperature range at which vanadium acts as a catalyst in this reaction and to extend this temperature range downward to a material extent.

Our invention, which is based on this discovery, consists in improving the contact method of making sulphuric acid by using a vanadium catalyst with rubidium as a promoter and in a vanadium and rubidium catalyst for use in said method.

While catalytic masses embodying the invention may be made in numerous different ways, we will, for the sake of illustration, describe a specific method for making such a mass which we have found satisfactory and effective in practice:

An aqueous solution of ammonium meta-vanadate ($NH_4VO_3$) is prepared. In this solution is immersed a porous carrier, such as celite (tradename applied to diatomite or diatomaceous earth sold by the Johns-Manville Corp., of 292 Madison Ave., N. Y. C.) chips calcined at about 1000° C. When the carrier has absorbed the solution to saturation, it is removed and dried at 110° C. It is then again immersed in the solution and dried, and the process is repeated till all the solution has been absorbed in the carrier. An aqueous solution of rubidium chloride (RbCl) is then applied to the carrier by sprinkling. After saturation with rubidium chloride, the carrier is dried at 110° C.

We have found that the action of rubidium as a promoter to the catalytic action of vanadium shows material increase with an increase in the proportion of rubidium present up to the point at which the amount of rubidium in the mass is, atomically, three times that of the vanadium. The proportion of the rubidium may be varied within this limit to satisfy conditions of use in which the maximum promotion is unnecessary. A desirable composition for commercial purposes is one in which the amounts of vanadium and rubidium are approximately atomically equal. To prepare such a mass by the above method, the proportions of the soluble salts and the carrier used are as follows:

Ammonium meta-vanadate____one part by weight
Rubidium chloride_____one part by weight
Carrier (calcined celite)_____6.3 parts by weight It is desirable, though not essential, to heat the impregnated carrier up to about 500° C. in an atmosphere containing $SO_2$ before using the mass.

In the manufacture of sulphuric acid in accordance with our invention, a mixture containing oxygen and sulphur dioxide gases is passed through a converter charged with the contact mass above described. The heat evolved by the combination of the gases coming in contact with the catalyst is systematically removed during the passage of the gases through the converter, so that the temperature of the gas in contact with the catalyst is reduced to a temperature of about 420° C. as it leaves the catalyst, material conversion taking place at the lower temperature, and affording a total conversion of 98%.

Comparative tests of the catalytic mass above described and a vanadium contact mass precisely similar in all respects with the mass described, except for the omission of the rubidium, show that at all temperatures, from 375° C. to 500° C., the percentage of conversion of $SO_2$ and O into $SO_3$ is materially increased by the presence of the rubidium, and that particularly at temperatures below 450° C. at which little conversion is obtained by the mass containing vanadium only, very material conversion is obtained by the mass containing vanadium and rubidium.

Our invention is by no means limited to a catalytic mass prepared in accordance with the specific method which has been given as an illustration. This method may readily be modified by the substitution of chemical equivalents, such as the use of other soluble vanadium compounds, instead of the ammonium meta-vanadate. Furthermore, although we have found that an advantage is gained by introducing the rubidium as a chloride or other neutral salt of a mineral acid, it is nevertheless true that satisfactory conversion may be obtained if other soluble rubidium compounds are substituted for such salts. Furthermore, it is not essential to apply the vanadium solution and the rubidium solution to the carrier separately. The solutions may be mixed before application to the carrier, or a single solution of a single soluble salt, such as rubidium-vanadate ($RbVO_3$) may be used with good results. The references to solutions containing vanadium and rubidium in the claims which follow should, therefore, be understood to include a single solution of a single salt, except where separate solutions are expressly specified.

What is claimed is:

1. A catalyst for use in the contact method of making sulphuric acid, comprising vanadium and rubidium, in which the gram-atoms of rubidium are less than four times the gram-atoms of vanadium.

2. A catalyst for use in the contact method of making sulphuric acid, comprising vanadium and rubidium, in which the gram-atoms of rubidium are approximately equal to the gram-atoms of vanadium.

3. A catalytic mass for use in the contact method of making sulphuric acid, comprising a porous carrier, and vanadium and rubidium on the surface and in the pores of said carrier.

4. A catalytic mass for use in the contact method of making sulphuric acid, comprising porous particles of substantially pure silica, and vanadium and rubidium on the surface and in the pores of said particles.

5. A catalytic mass for use in the contact method of making sulphuric acid, comprising a porous carrier of the type of calcined diatomite, which has been impregnated with soluble salts containing vanadium and rubidium.

6. A catalytic mass for use in the contact method of making sulphuric acid, comprising a porous carrier of calcined diatomite, which has been impregnated with a soluble salt containing vanadium and a separate soluble salt containing rubidium.

7. A catalytic mass for use in the contact method of making sulphuric acid, comprising a porous carrier, which has been impregnated with solutions containing vanadium and rubidium, and which has been heated after impregnation, and previous to use, in an atmosphere containing sulphur dioxide.

8. A catalytic mass for use in the contact method of making sulphuric acid, comprising a porous carrier of calcined diatomite, which has been impregnated with a vanadate solution and a separate solution containing rubidium, and which has been heated after impregnation, and previous to use, in an atmosphere containing sulphur dioxide.

9. A catalytic mass for use in the contact method of making sulphuric acid, comprising a silica carrier which has been impregnated with a vanadium solution and a solution of a neutral rubidium salt of a mineral acid.

10. A catalytic mass for use in the contact method of making sulphuric acid, comprising a silica carrier which has been impregnated with a vanadium solution and a solution of rubidium chloride.

11. The method of making sulphur trioxide, which consists in passing a mixture of gases containing oxygen and sulphur dioxide at an elevated temperature through a catalytic mass which consists of porous particles of substantially pure silica impregnated with solutions containing vanadium and rubidium.

12. The method of making sulphur trioxide, which consists in passing a mixture of gases containing oxygen and sulphur dioxide at an elevated temperature through a catalytic mass consisting of a porous carrier carrying vanadium and rubidium, and in reducing the temperature of the gases so that as they leave the mass they are at approximately 420° C.

13. A catalyst for use in the contact method of making sulphuric acid comprising vanadium and rubidium in non-zeolitic relation with respect to each other, the catalyst being deposited upon an inert carrier.

14. A catalyst for use in the contact method of making sulphuric acid comprising a siliceous carrier having vanadium and rubidium deposited in non-zeolitic relation upon the surface thereof.

ALLING P. BEARDSLEY.
NAPOLEON ARTHUR LAURY.